US012190269B2

(12) United States Patent
Kumar et al.

(10) Patent No.: US 12,190,269 B2
(45) Date of Patent: *Jan. 7, 2025

(54) METHODS AND SYSTEMS FOR ASSOCIATION RULE MINING

(71) Applicant: McKesson Corporation, Irving, TX (US)

(72) Inventors: Anshul Kumar, Glen Allen, VA (US); Jacob Hookom, Chaska, MN (US); Duy Tran, Saint Paul, MN (US)

(73) Assignee: McKesson Corporation, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,390

(22) Filed: May 15, 2023

(65) Prior Publication Data

US 2023/0368097 A1 Nov. 16, 2023

Related U.S. Application Data

(63) Continuation of application No. 16/370,185, filed on Mar. 29, 2019, now Pat. No. 11,651,310.

(51) Int. Cl.
*G06Q 10/06* (2023.01)
*G06F 16/903* (2019.01)
*G06N 5/025* (2023.01)
*G06Q 10/0631* (2023.01)
*G06Q 30/0282* (2023.01)

(52) U.S. Cl.
CPC . *G06Q 10/06315* (2013.01); *G06F 16/90335* (2019.01); *G06N 5/025* (2013.01); *G06Q 30/0282* (2013.01)

(58) Field of Classification Search
None
See application file for complete search history.

(56) References Cited

U.S. PATENT DOCUMENTS

2012/0221442 A1* 8/2012 Olejniczak ............. G06Q 30/02 705/27.1
2017/0262781 A1* 9/2017 Yang ................ G06Q 10/06393
(Continued)

OTHER PUBLICATIONS

Shah et al. (S. Shah and S. Parikh, "Issues in Medical Diagnosis Using Computational Techniques," 2012 Fourth International Conference on Computational Intelligence and Communication Networks, 2012, pp. 348-354, doi: 10.1109/CICN.2012.134.).*

(Continued)

*Primary Examiner* — Matthew D Henry
(74) *Attorney, Agent, or Firm* — Ballard Spahr LLP

(57) ABSTRACT

Provided are methods, systems, and apparatuses for improving supply chain management interfaces and functionality. A frequency of occurrence for each unique combination of a use attribute and a product attribute for various supplies may be determined. A frequency table containing each unique combination may be generated as well as one or more association rules. A level of confidence and a level of lift may be determined for each of the one or more association rules, both of which may be used to generate a score for each unique combination that may be used to rank each unique combination. The ranked unique combinations may then be provided to a supply chain management interface and a database.

20 Claims, 15 Drawing Sheets

(56) References Cited

U.S. PATENT DOCUMENTS

2018/0330821 A1* 11/2018 Kano ..................... A61B 5/743
2020/0219006 A1* 7/2020 Wang ..................... G06N 20/00

OTHER PUBLICATIONS

Shah et al., "Issues in Medical Diagnosis Using Computational Techniques," 2012 Fourth International Conference on Computational Intelligence and Communication Networks, 2012, pp. 348-354, doi: 10.1109/CICN.2012.134.).

* cited by examiner

FIG. 3G

| Diagnosis | Diagnosis Frequency | Product | Product Frequency | Confidence | Lift | Rank | Hcpcs | Policy Group Name |
|---|---|---|---|---|---|---|---|---|
| Epidermolysis bullosa dystrophica | 0.1242 % | [GAUZE ELASTIC 4 X 4.1 YDS STERILE] | 1.3347 % | 3.630 % | 2.13 | 75 | A6445 | SURGICAL DRESSINGS |
| Epidermolysis bullosa dystrophica | 0.1242 % | [APPLICATOR COTTON TIP 6 INCH STR 2/PK] | 1.8460 % | 3.192 % | 2.29 | 74 | A4649 | MISC DMEPOS |
| Epidermolysis bullosa dystrophica | 0.1242 % | [DRESSING MEPILEX BORDER 4 X 4] | 1.0896 % | 3.340 % | 3.09 | 73 | A6212 | SURGICAL DRESSINGS |
| Epidermolysis bullosa dystrophica | 0.1242 % | [SALINE STERILE FOR IRRIGATION 500ML] | 0.9036 % | 2.804 % | 6.60 | 72 | A4217 | UROLOGICAL SUPPLIES |
| Epidermolysis bullosa dystrophica | 0.1242 % | [PAD ALCOHOL PREP MEDIUM] | 0.6521 % | 3.507 % | 5.38 | 71 | A4245 | INFUSION PUMPS & RELATED DRUGS |
| Epidermolysis bullosa dystrophica | 0.1242 % | [GLOVE NITRILE N/S PF LARGE 100/BX] | 1.0923 % | 5.219 % | 4.78 | 70 | A4927 | |
| Epidermolysis bullosa dystrophica | 0.1242 % | [SPONGE NON-WOVEN 4X4 4-PLY STR 2'S] | 1.0547 % | 6.764 % | 6.41 | 69 | A6402 | SURGICAL DRESSINGS |
| Epidermolysis bullosa dystrophica | 0.1242 % | [DRESSING SILVERCEL NON-ADH 4-1/4 X 4-3/4] | 0.8971 % | 2.255 % | 33.22 | 68 | A6196 | SURGICAL DRESSINGS |
| Epidermolysis bullosa dystrophica | 0.1242 % | [DRESSING TELFA NON-ADHERENT 3 X 8 STR] | 0.1336 % | 2.923 % | 21.87 | 67 | A6403 | SURGICAL DRESSINGS |
| Epidermolysis bullosa dystrophica | 0.1242 % | [GAUZE NONWOVEN 4X4 4-PLY N/S 200/PK] | 1.5727 % | 10.647 % | 6.77 | 66 | A4629 | TRACHEOSTOMY SUPPLIES |
| Epidermolysis bullosa, unspecified | 0.1450 % | [GAUZE ELASTIC 4 X 4.1 YDS STERILE] | 1.2347 % | 2.110 % | 1.71 | 65 | A6445 | SURGICAL DRESSINGS |
| Epidermolysis bullosa, unspecified | 0.1450 % | [TAPE TRANSPORE 1 X 10 YD] | 0.1821 % | 3.758 % | 20.63 | 65 | A4452 | SURGICAL DRESSINGS |
| Epidermolysis bullosa, unspecified | 0.1450 % | [BANDAGE COBAN 4 X 5 YD] | 0.5168 % | 2.504 % | 4.84 | 64 | A6454 | SURGICAL DRESSINGS |
| Epidermolysis bullosa, unspecified | 0.1450 % | [UNDERPAD SIMPLICITY FLUFF 23 X 36] | 1.1374 % | 10.104 % | 8.88 | 64 | A4554 | UROLOGICAL SUPPLIES |
| Epidermolysis bullosa, unspecified | 0.1450 % | [GLOVE NITRILE N/S PF MEDIUM 100/BX] | 1.3779 % | 11.900 % | 8.64 | 63 | A4927 | |
| Epidermolysis bullosa, unspecified | 0.1450 % | [PAD ALCOHOL PREP MEDIUM] | 0.6521 % | 3.720 % | 5.70 | 63 | A4245 | INFUSION PUMPS & RELATED DRUGS |
| Epidermolysis bullosa, unspecified | 0.1450 % | [GAUZE ROLL BICCKLARD 8-PLY 4.5 X 4.1 YDS] | 0.0374 % | 2.129 % | 56.92 | 62 | A5266 | SURGICAL DRESSINGS |
| Epidermolysis bullosa, unspecified | 0.1450 % | [GLOVE NITRILE N/S PF LARGE] | 1.0923 % | 4.628 % | 4.42 | 62 | A4927 | |

METHODS AND SYSTEMS FOR ASSOCIATION RULE MINING

CROSS-REFERENCE TO RELATED PATENT APPLICATION

This application is a continuation of U.S. application Ser. No. 16/370,185, filed on Mar. 29, 2019, the entirety of which is incorporated by reference herein.

BACKGROUND

The expanded use of supply chain management (SCM) software has allowed organizations to quickly gain access to a significant amount of information for numerous, and even granular, aspects of their supply chain and organizational operations. Unfortunately, what often results from existing SCM software is irrelevant and/or overly complicated information being reported. These drawbacks prevent an organization from easily making simple yet effective changes to their supply chain and organizational operations. These and other shortcomings are addressed by the present disclosure.

SUMMARY

It is to be understood that both the following general description and the following detailed description are exemplary and explanatory only and are not restrictive. Provided herein are methods, systems, and apparatuses for improving SCM systems and functionality. A group of association rules for various supplies within a supply database may be generated by first determining a frequency of occurrence for each unique combination of use attribute and product attribute for the various supplies. Using the frequency of occurrence for each unique combination, a frequency table containing each unique combination may be generated. Based on the frequency table, one or more association rules may be generated. A level of confidence and a level of lift may be determined for each of the one or more association rules, both of which may be used to generate a score for each unique combination. The score for a given unique combination may be used to determine a corresponding rank. The ranked unique combinations may then be provided to a SCM system and database. Additional advantages will be set forth in part in the description which follows or may be learned by practice.

The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and, together with the description, serve to explain the principles of the methods, systems, and apparatuses described herein:

FIG. 3G shows an example generated by a data mining engine;

DETAILED DESCRIPTION

Figure 1:
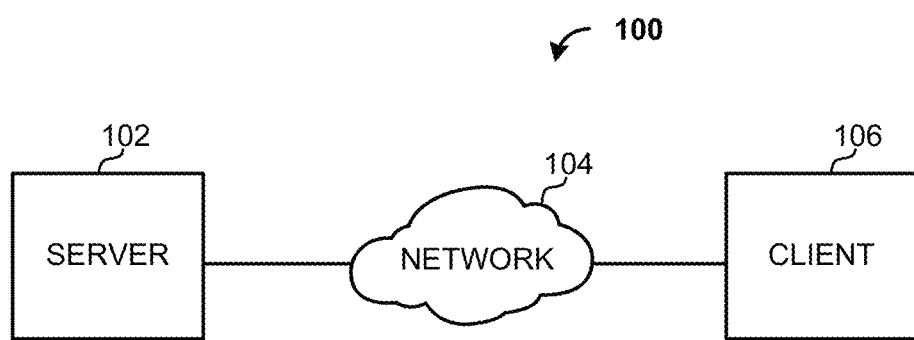
FIG. 1 shows a block diagram of an example client/server environment.

Before the present methods, systems, and apparatuses are disclosed and described, it is to be understood that the methods, systems, and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods, systems, and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, systems, and apparatuses. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods. The present methods, systems, and apparatuses may be understood more readily by reference to the following detailed description of preferred embodiments and the examples included therein and to the figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

As will be described in greater detail herein, the systems, methods, and apparatuses provided herein may be used to perform data mining operations on SCM records associated with an organization, such as a medical services provider. The systems, methods, and apparatuses may also provide a user interface allowing a user to perform a search for related supplies based on a use (e.g., supplies for a given medical condition). The data mining operations may be performed by a data mining engine configured to mine information stored on a computer network such as the Internet, an intranet, a server farm, a personal computer, etc. The data mining engine may use regularly updated indexes to operate quickly and efficiently (e.g., batch information collected for an organization on a routine basis). The data mining engine may refer to a web-based data mining engine, which mines information on an intranet, private server, database, etc. Additionally, the data mining engine may be an enterprise data mining engine, which mines information stored on intranets, personal computers, mobile devices, and/or combinations thereof.

The data mining engine may operate algorithmically to crawl electronic records (e.g., SCM data and/or purchase history data for an organization), index the electronic records, and mine the index. The electronic records may each comprise a use attribute (e.g., a given medical condition) and a product attribute (e.g., a product identifier). The data mining engine may generate one or more association rules based on unique combinations of a use attribute and a product attribute for the various supplies. The data mining engine may determine a frequency of occurrence for each unique combination of use attribute and product attribute. The frequency of occurrence for each unique combination may be determined by the data mining engine based on an association rule mining algorithm, such as an apriori algorithm, a frequent pattern ("FP") algorithm, and the like. Using the frequency of occurrence for each unique combination, the data mining engine may generate a frequency table containing each unique combination. Based on the frequency table, one or more association rules may be generated. A level of confidence and a level of lift may be determined for each of the one or more association rules (e.g., based on a minimum support threshold), both of which may be used to generate a score for each unique combination. The data mining engine may use the score for each unique combination to generate a rank for each unique combination. The ranked unique combinations may then be provided to a SCM system and database.

An SCM system may include a search engine, which may receive a search query and in turn retrieve a list of search results responsive to the search query. The search query may be user-defined or system-defined. The search query may comprise one or more query types. A system-defined query type may be, for example, a selection by a user, via a user interface, of one or more use attributes for one or more products (e.g., medical supplies for diabetes; medications for diabetes; etc.). Each of the system-defined queries may return search results that comprise a list of products (e.g., selected based on the one or more association rules generated by the data mining engine). A search query may also comprise a keyword, a phrase, a product name, an entity and/or organization name, combinations thereof, and the like. Search results may be any electronic file, including by way of example and not meant to limiting, Active Server Page script files, Bitmap image files, Cold Fusion script files, Common Gateway Interface script/program files, Cascading Style Sheet markup files, Comma Separated Value text files, Dynamic HyperText Markup Language files, Microsoft Word Document files, Graphics Interchange Format image files, HyperText Markup Language (HTM or HTML) files, Joint Photographic Experts Group image files, Adobe Acrobat Portable Document Files, Perl script files, Portable Network Graphics image files, Rich Text Format document files, Tagged Image File Format image files, Plain Text files, Extensible Markup Language files, combinations thereof, and the like.

Search results may be transmitted over the World Wide Web utilizing the Hypertext Transfer Protocol (HTTP) or HTTPS, which is the secure version of HTTP. Search results may have an address (Uniform Resource Indicator (URI)) which appears in the address bar of a web browser. Addresses may have prefixes of which HTTP and HTTPS are two kinds. HTTP is the set of rules for exchanging electronic files (text, graphic images, sound, video, and other multimedia files) on the World Wide Web. Relative to the TCP/IP suite of protocols (which are the basis for information exchange on the Internet), HTTP is an application protocol. HTTP is the most popular URI scheme used on the World Wide Web. The HTTP scheme defines the scheme-specific part of its absolute URI as a string of characters beginning with two slashes, followed by authority (host name with optional port number, separated by a column), followed by an optional path part, and followed by an optional query part, separated from the previous part with a question mark.

The secure hypertext transfer protocol (HTTPS) is a communications protocol designed to transfer encrypted information between computers over the World Wide Web. HTTPS is HTTP using a Secure Socket Layer (SSL). HTTPS is a URI scheme equivalent to the http scheme. It signals the web browser to use HTTP with added encryption layer of SSL/TLS to protect the traffic. SSL is especially suited for HTTP since it may provide some protection even if only one side to the communication is authenticated.

Figure 2:
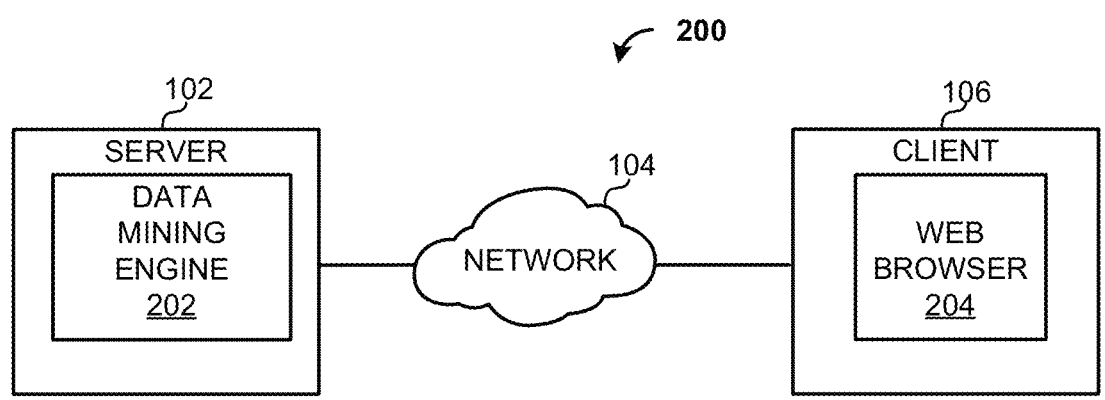
FIG. 2 shows a block diagram of an example client/server environment.

FIG. 1 and FIG. 2 are block diagrams depicting non-limiting examples of a server 102 and a client 106 connected through a network 104 according to an aspect. The server 102 may comprise one or multiple computers configured to operate a data mining engine 202, as shown in FIG. 3. The client 106 may comprise one or multiple computers configured to operate a web browser 204 such as, for example, a laptop computer or a desktop computer. Multiple clients 102 may connect to the server 102 through a network 104 such as, for example, the Internet. A user on a client 106 may connect to the data mining engine 202 with the web browser 204. The data mining engine 202 may be configured to mine information stored on a computer network such as the Internet, an intranet, a server farm, a personal computer, etc.

Figure 3A:
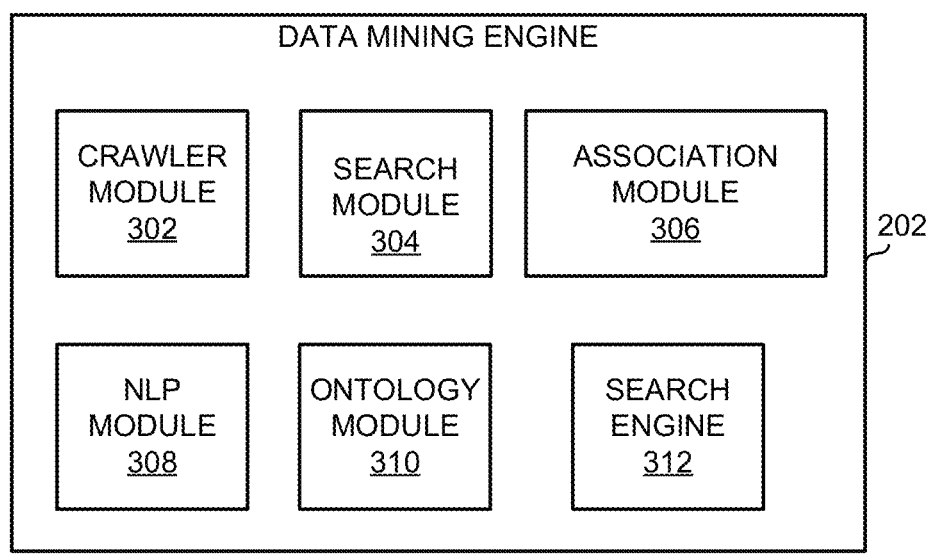
FIG. 3A shows a block diagram of an example data mining engine.

FIG. 3A is block diagram depicting an exemplary view of a data mining engine 202 according to an aspect. The data mining engine 202 may use regularly updated indexes to operate quickly and efficiently (e.g., batch information collected for an organization on a routine basis). The data mining engine 202 may refer to a web-based data mining engine, which mines information on an intranet, private server, database, etc. Additionally, the data mining engine 202 may be an enterprise data mining engine, which mines information stored on intranets, personal computers, mobile devices, and/or combinations thereof. The data mining engine 202 may comprise one or more of a crawler module 302, a search module 304, an association module 306, a natural language processing (NLP) module 308, an ontology module 310, and a search engine 312.

Crawler module 302 may retrieve and analyze electronic documents to determine how to index the electronic documents (e.g., batches of information/data related to an organization). The electronic documents retrieved and analyzed by the crawler module 302 may include a plurality of records for a plurality of patients. A given record of the plurality of records may contain demographic information attributes for a patient associated with the given record. The demographic information attributes for a given patient may include, but are not limited to, age, gender, height, weight, ethnicity, medication(s), diagnosis, address, income, a combination thereof and the like. The crawler module 302 may index the electronic documents based on the demographic information attributes for each patient associated with each of the plurality of records (e.g., sort the electronic records based on one or more demographic information attributes).

Figure 3B:
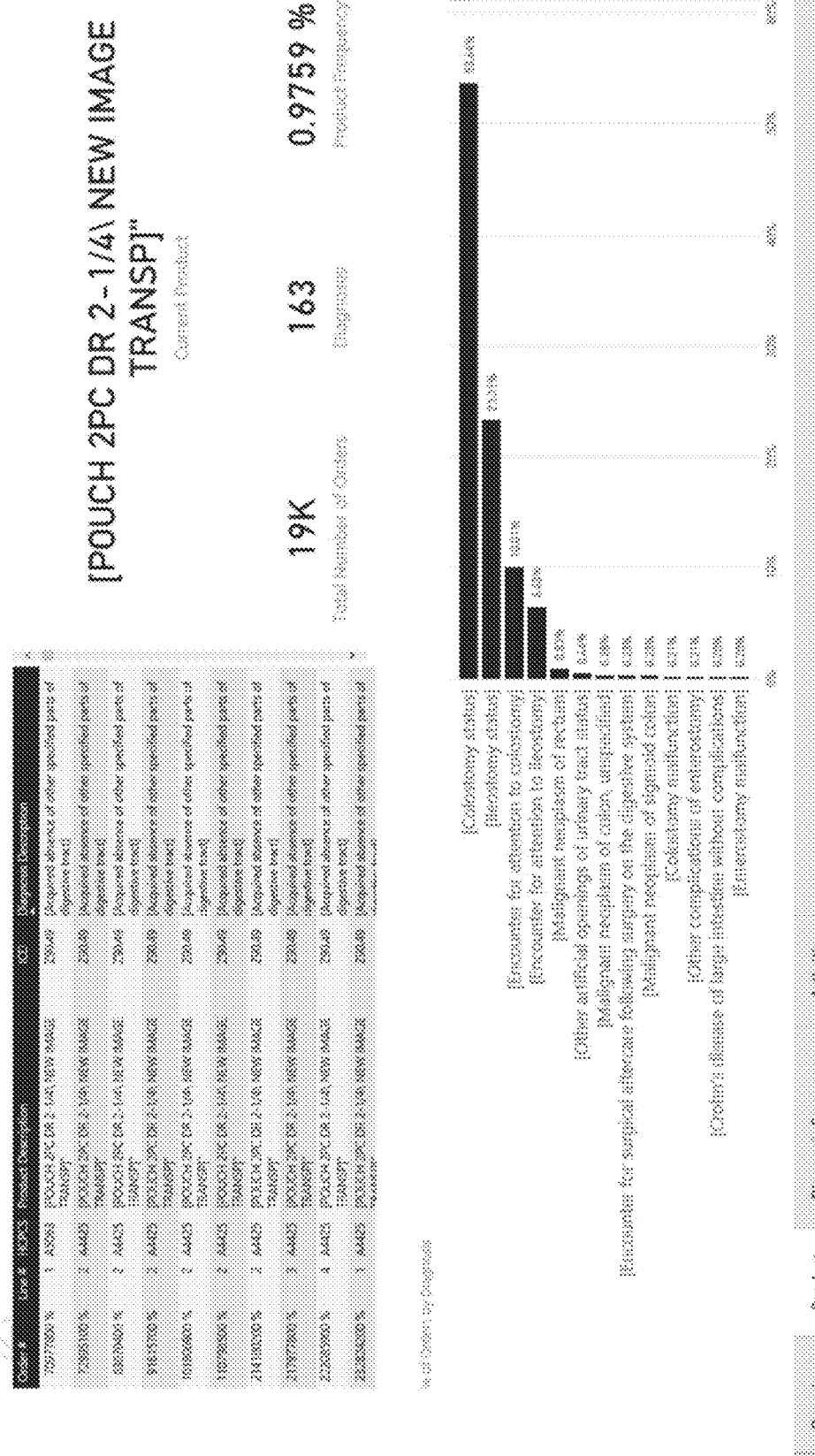
FIG. 3B shows an example generated by a data mining engine.
Figure 3C:
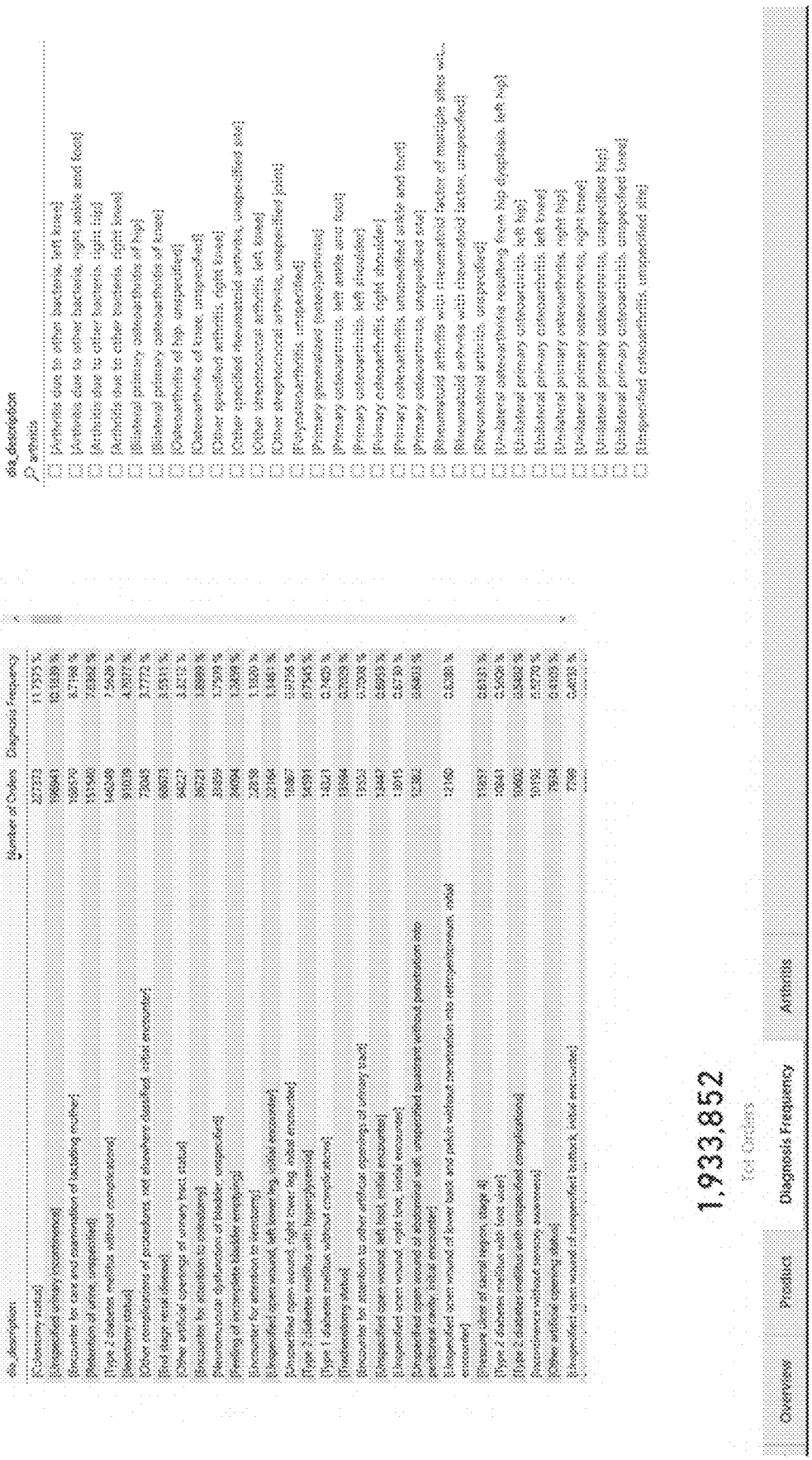
FIG. 3C shows an example generated by a data mining engine.
Figure 3D:
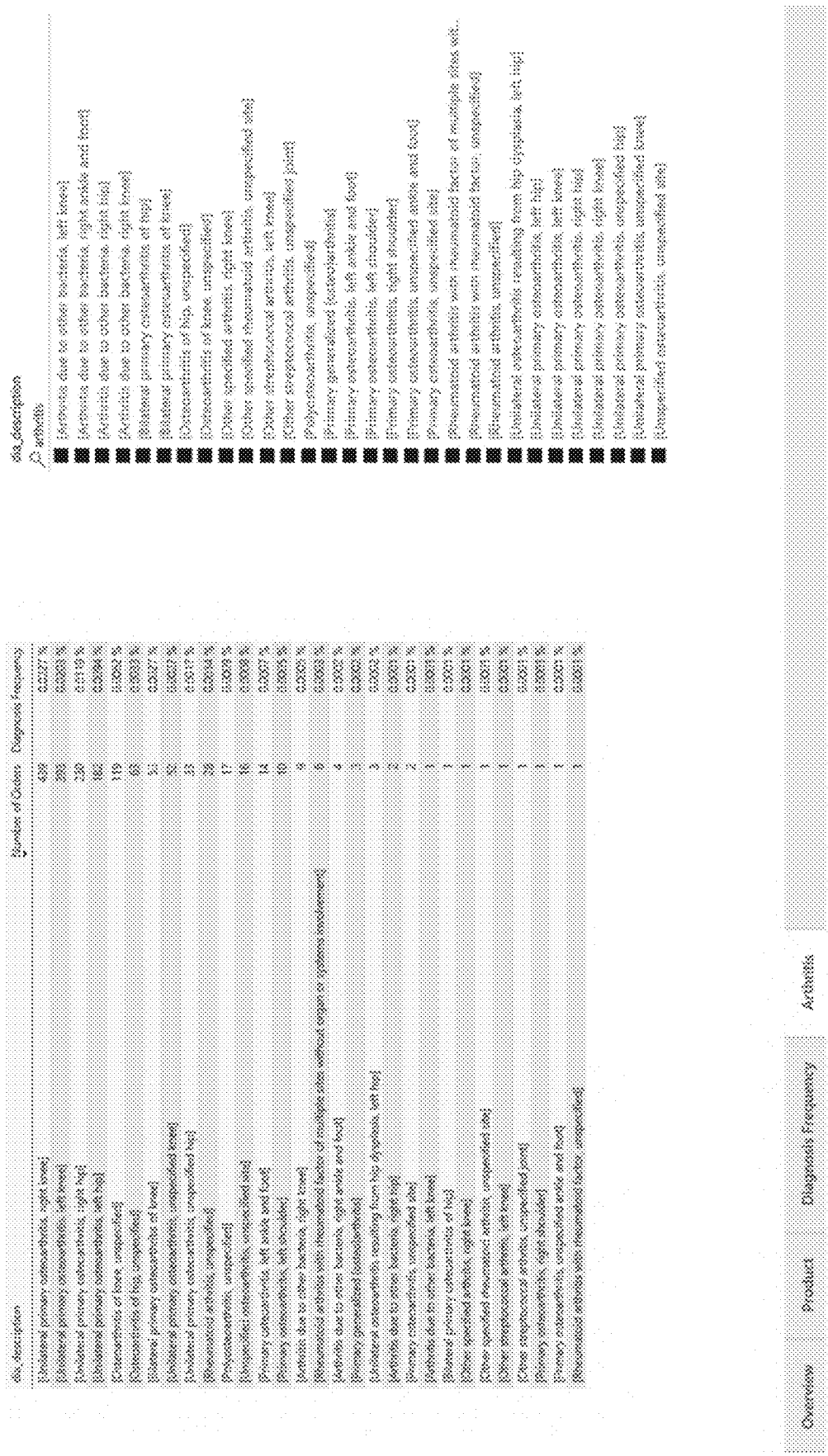
FIG. 3D shows an example generated by a data mining engine.
Figure 3E:
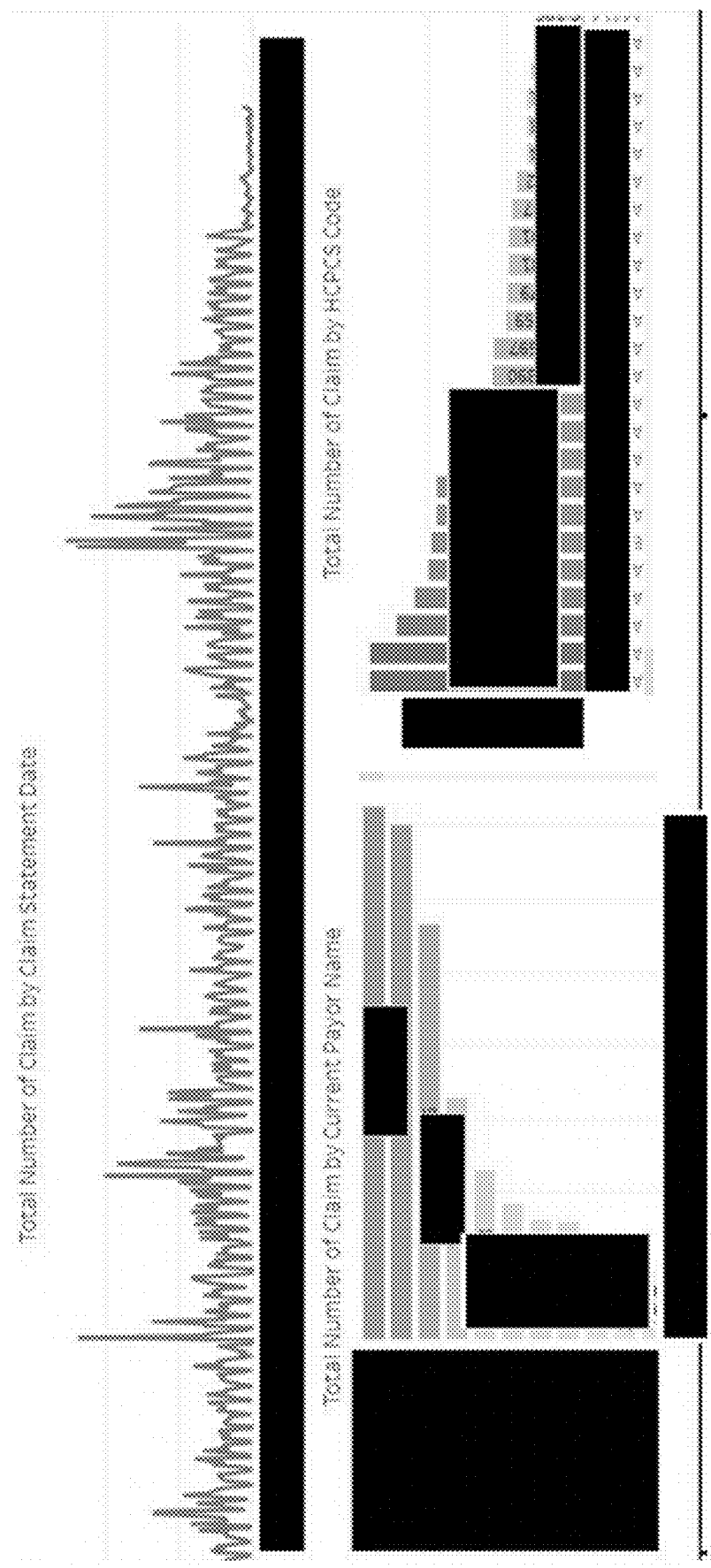
FIG. 3E shows an example generated by a data mining engine.

Data about the electronic documents may be stored in the data mining engine 202 for use in queries by search module 304. The association module 306 may generate one or more association rules based on unique combinations of use attributes and product attributes for the various supplies within the electronic documents. The association module 306 may determine a frequency of occurrence for each unique combination of a use attribute and a product attribute. The frequency of occurrence for each unique combination may be determined by the association module 306 based on an association rule mining algorithm, such as an apriori algorithm, a frequent pattern ("FP") algorithm, and the like. Using the frequency of occurrence for each unique combination, the association module 306 may generate a frequency table containing each unique combination. An example frequency table containing unique combinations of a given use attribute (e.g., ICD code Z90.49) and a plurality of product attributes is shown in FIG. 3B. The association module 306 may also generate frequency tables for an occurrence of a given use attribute (e.g., arthritis), examples of which are shown in FIGS. 3C and 3D. Based on the frequency table, one or more association rules may be generated by the association module 306. The association module 306 may determine a level of confidence and a level of lift for each of the one or more association rules (e.g., based on a minimum support threshold), both of which may be used to generate a score for each unique combination. The data mining engine may use the score for each unique combination to generate a rank for each unique combination. The rank for each unique combination may be based on a preference provided by a third party payor (e.g., an insurance company) such that a list of the unique product attributes, as discussed below, may be provided in a sorted order of highest-to-lowest rank based on the preference. As shown in FIG. 3E, the preference may be based on a total number claims associated with each unique combination, a total number claims associated with the third party payor; a total number of claims associated with a given use attribute (e.g., a given diagnosis code); a combination thereof; and/or the like.

Figure 3F:
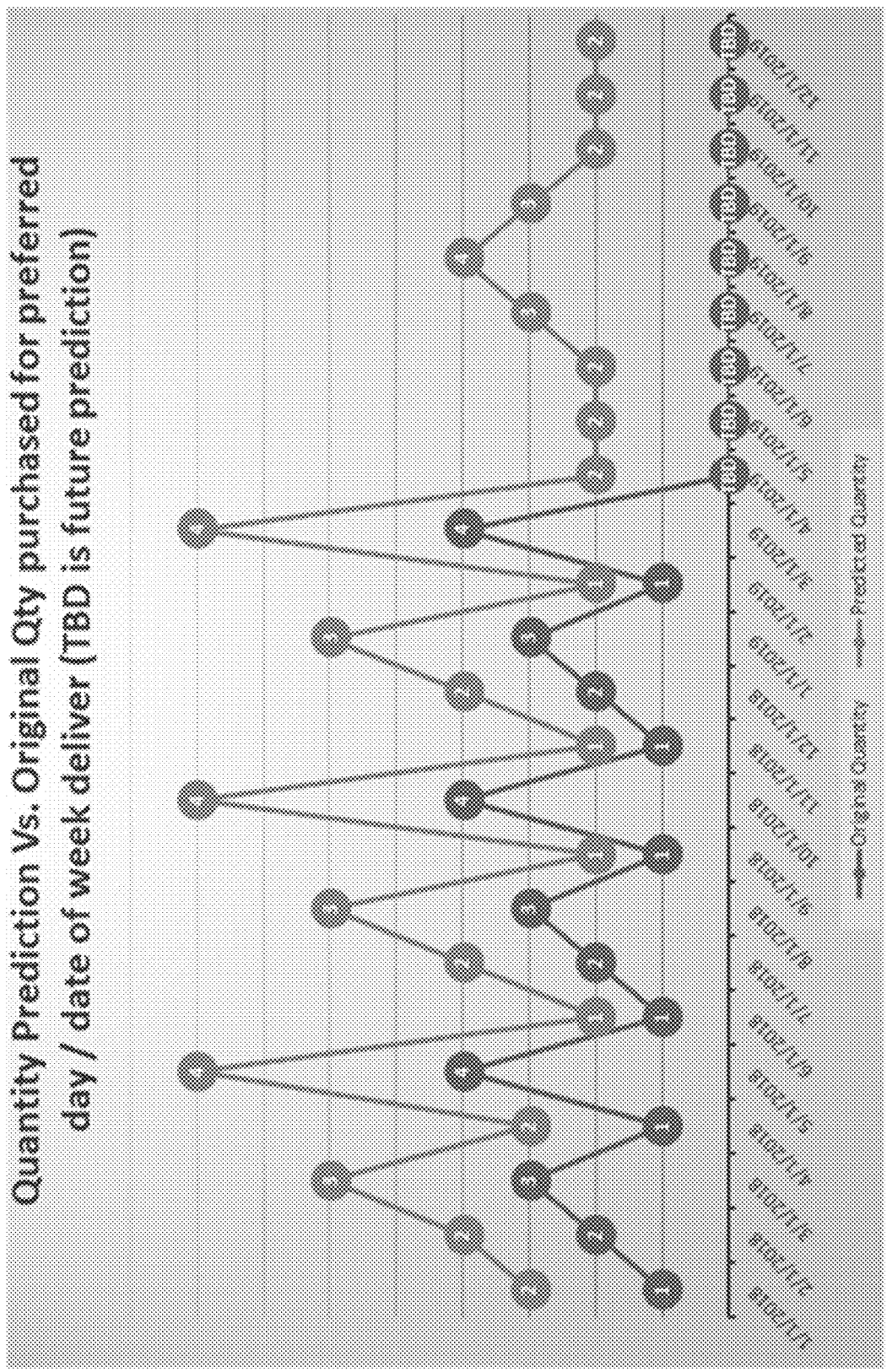
FIG. 3F shows an example generated by a data mining engine.

The data mining engine 202 may receive a query including a use attribute. The data mining engine 202 may determine (e.g., based on the use attribute of the query) one or more product attributes and a suggested quantity for each of the one or more product attributes. The suggested quantity for each of the one or more product attributes may be based on symptom attributes associated with the use attribute provided in the query (e.g., cough, fever, pain, etc.); historical purchasing behavior associated with the product attributes; an amount of an allowance provided by associated claims payors, a combination thereof, and/or the like. In addition to the suggested quantity for each of the one or more product attributes, an ordering schedule may also be suggested. The ordering schedule may be based on existing purchasing cadence associated with the product attributes and an organization, as shown in FIG. 3F. The ranked unique combinations may then be provided by the search module 304, as shown in FIG. 3G.

The search module 304 may be configured to perform one or more types of searches. A search may be user-defined or system-defined. A search query may comprise one or more query types. A system-defined query type may be, for example, a selection by a user, via a user interface in communication with the search module 304, of one or more use attributes for one or more products (e.g., medical supplies for diabetes; medications for diabetes; etc.). Each of the system-defined queries may be used by the search module 304 to return search results that comprise a list of products (e.g., selected based on the one or more association rules generated by the data mining engine).

A search query may also comprise a keyword, a phrase, a product name, an entity and/or organization name, combinations thereof, and the like. In an aspect, the search module 304 may be configured to perform a keyword search and/or a semantic search. A keyword search is a type of search that looks for matching documents (e.g., electronic files) that contain one or more words specified by a user. A semantic search seeks to improve search accuracy by understanding searcher intent and the contextual meaning of terms as they appear in the searchable dataspace, whether on the Web or within a closed system, to generate more relevant results. In an aspect, a semantic search technique may be used to build a semantic model from a set of documents (e.g., webpages, emails, or documents on a file system, for example), and given a search query, find the set of documents that best relate to that query. For example, an inverted index of all words in a document across all documents may be built, and then using various relevancy metrics, the words of the search query (e.g., assumed to be another kind of document) may be compared against the index, and a ranked set of files may be identified that are "closest" to the query. In practice, this serves to simulate semantic search because words that represent a semantic concept tend to cluster together in co-occurrences. The search module 304 may interact with one or more of the NLP module 308 and/or the ontology module 310 to effect a semantic search. For example, the search module 304 may parse a query and use the NLP module 308 and/or the ontology module 310 to develop a list of other related terms, concepts, and/or contexts that may correlate to information desired by a user. The search module 304 may thus generate related terms and/or concepts that relate to a query type using, for example, an ontology. The related terms and/or concepts may be used to expand the query to identify documents that are relevant to the query.

The NLP module 308 may analyze textual information from search queries, search results, indexed electronic files (e.g., batch information received for an organization), combinations thereof, and the like. Textual information may be input into the NLP module 308, and the NLP module 308 may generate a cognitive model of the input text. In other words, a query in natural language may be parsed into the representation format of first-order logic and naive semantics. A naive semantic system that incorporates modules for text processing based upon parsing, formal semantics and discourse coherence, as well as relying on a naive semantic lexicon that stores word meanings in terms of a hierarchical semantic network is disclosed. The cognitive model may then passed to the search module 304, that may use a high recall statistical retrieval module (not shown) using unspecified statistical techniques to produce a list of documents and a relevance reasoning module (not shown) which may use first-order theorem proving and human-like reasoning to determine which documents/charts/graphs should be presented to the user. Textual information may be based on sentence structure, for example, based on a word-by-word analysis and/or a whole sentence analysis. In an aspect, the NLP module 308 may determine word frequencies for some or all words contained in textual information. The NLP module 308 may be configured to disambiguate and resolve homograph issues to accurately identify words and their frequencies.

The ontology module 310 which may be configured for performing a concept-based method for searching text information (e.g., contained within received batch information). The ontology module 310 may interact with the NLP module 308 to transform a natural language query into predicate structures representing logical relationships between words in the natural language query. The ontology module 310 may comprise one or more ontologies and/or thesauri containing lexical semantic information about words and may be configured for ranking a set of matching natural language query predicate structures and equivalent textual information predicate structures. The ontology module 310 may provide a logical representation and/or a semantic representation for all of the content in an electronic document. In an aspect, such a logical representation and/or a semantic representation may be referred to herein as a data profile. A thesaurus is a structured controlled vocabulary. The thesaurus provides information about each term and its relationships to other terms within the same thesaurus. In addition to specifying which terms may be used as synonyms (called "used from"), a thesaurus also indicates which terms are more specific (narrower terms), which are broader, and which are related terms. An ontology is set of concepts with attributes and relationships between the various concepts that contain various meanings, all to define a domain of knowledge, and is expressed in a format that is machine-readable. Certain applications of ontologies, as used in artificial intelligence or biomedical informatics, may define a domain of knowledge through terms and relationships. In the area of taxonomies and information science, however, an ontology may be seen as a more complex type of thesaurus, in which instead of having simply "related term" relationships, there are various customized relationship pairs that contain specific meaning, such as "owns" and a reciprocal "is owned by."

The ontology module 310 may generate one or more data profiles, optionally in conjunction with the NLP module 308. A data profile may comprise a list of concepts and/or terms and their associated relevance weights. A weight may indicate an importance of a concept/term with regard to other concepts/terms. The weights may represent, for example, the frequency with which the concepts occur in textual information, the specificity of the concepts, statistical characteristics of each concept, and the like. Statistical characteristics of concepts may include, without limitation, the specificity, the sensitivity, the number of alternatives occurring in the textual information, the textual similarity, and the like.

The ontology module 310 and/or the NLP module 308 may determine a weight for a concept/term in received batch information documents (e.g., purchase order records, shipment records, inventory records, and the like) by calculating a number of occurrences (e.g., a frequency) of all concepts/terms (e.g., medication name, item type, size, intended use, etc.). For example, if Product A (e.g., "gloves") occurs ten times in a document and Product B (e.g., "scrubs") occurs five times in the document, the frequency of Product A may be "normalized" to 100% ((10/10)*100%) and Product B may be "normalized" to 50% ((5/10)*100%). The following equation may be used for normalization: (frequency/max_frequency)*100%. A correction algorithm may reduce the weight of concepts/products that occur in many documents. For example, if a purchase order record is indexed, a very generic term like "sterile" will not be very informative while a term like "acetaminophen" is very specific. Therefore, if the frequency of the term "sterile" in a document is higher than the frequency of the term "acetaminophen," then the term "acetaminophen" would have higher weight after correction.

In an aspect, the ontology module 310 and/or the NLP module 308 may generate a data profile based on a search query and/or a one or more association rules. The resulting data profile may be used to identify one or more search results based on a comparison between a query data profile and data profiles of potential search results. For example, an amount of overlap between the query data profile and the data profiles of potential search results may identify relevant search results. Determining an overlap of data profiles among a plurality of data profiles may comprise determining a number of terms that data profiles have in common. In another aspect, a similarity score may be generated that reflects a similarity between a query data profile and the data profiles of potential search results. Determining a similarity score amongst a plurality of data profiles may comprise performing a matching algorithm. Performing a matching algorithm may comprise storing each data profile as a vector and performing a vector matching algorithm. In one exemplary aspect, a data profile may be stored mathematically as a vector with values between 0 and 1. In this aspect, the matching of a query data profile with a stored data profile may be accomplished via vector matching. As one skilled in the art will appreciate, a variety of algorithms known in the art may be used to calculate the distance between the vectors. In a further aspect, the various algorithms for determining the distance between vectors may comprise, but are not limited to, Vector algorithm, Portal algorithm, Quadsum algorithm, Jaccard algorithm, Dice algorithm, Basic algorithm, Weighted algorithm, Orion algorithm, Weighted Overlap algorithm, and the like. It is contemplated that one or more of these algorithms may be used concurrently.

The search engine 312 may comprise a database listing comprising, for example, electronic documents, electronic document metadata, and the like, referred to herein as search results. The search engine 312 may be configured to maintain a listing of data profiles and/or association rules. Searching by the search engine 312 may utilize metadata. For example, the metadata may comprise performing a Boolean search. Searching by metadata may comprise performing a search by determining a deviation of a metadata value from a specified value and expressing the deviation in a relevance score. Searching by vector matching may comprise storing each data profile as a vector and performing a vector matching algorithm. Searching by metadata and by vector matching may be performed simultaneously or sequentially.

In a further aspect, the association module 306 may be configured to update the one or more association rules based on new information related to the organization, or an entity thereof. For example, the association module 306 may retrieve data about an organization, or an entity thereof, from one or more data sources. By way of example, the association module 306 may receive batch information for an organization entity (e.g., supply purchase orders, sales, current inventory, etc.) from the one or more data sources. The association module 306 may retrieve the batch information from the one or more data sources and automatically mine the corresponding data. For example, the association module 306 may pass the corresponding data to one or more of the NLP module 308 and/or the ontology module 310 to mine and classify the data. The classified data may be used by the association module 306 to update the one or more association rules. The association module 306 may retrieve purchase order records for an organization entity for a particular time period (e.g., last 90 days, etc.). The association module 306 may continue to monitor the one or more data sources to update/refine the one or more association rules.

Figure 4:
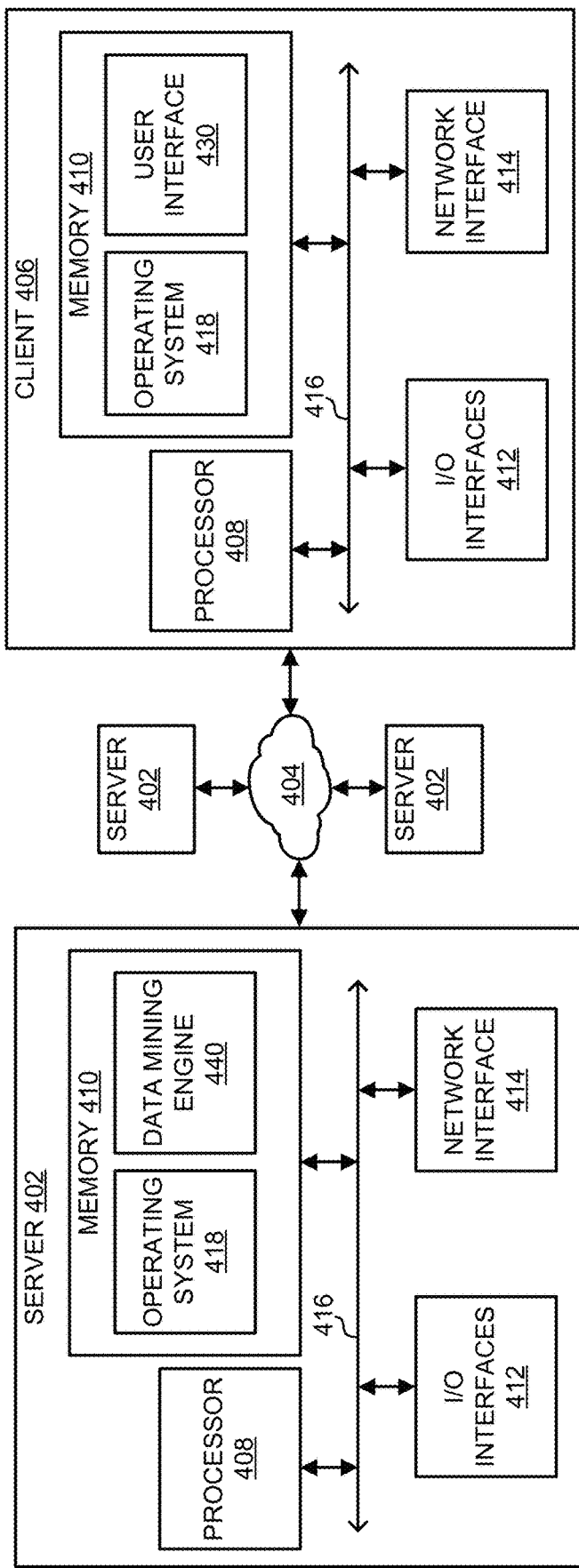
FIG. 4 shows a block diagram of an example client/server environment.

FIG. 4 is a block diagram depicting an environment 400 comprising non-limiting examples of a server 402 and a client 406 connected through a network 404. The server 402 may comprise one or multiple computers configured to store the data mining engine 202. The client 406 may comprise one or multiple computers configured to operate a user interface (e.g., via a web browser) such as, for example, a laptop computer or a desktop computer. Multiple clients 406 may connect to the server(s) 402 through a network 404 such as, for example, the Internet. A user on a client 406 may connect to the data mining engine 202 with a user interface 430.

The server 402 and the client 406 may be a digital computer that, in terms of hardware architecture, generally includes a processor 408, memory system 410, input/output (I/O) interfaces 412, and network interfaces 414. These components (408, 410, 412, and 414) are communicatively coupled via a local interface 416. The local interface 416 may be, for example but not limited to, one or more buses or other wired or wireless connections, as is known in the art. The local interface 416 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 408 may be a hardware device for executing software, particularly that stored in memory system 410. The processor 408 may be any custom made or commercially available processor, a central processing unit (CPU), an auxiliary processor among several processors associated with the server 402 and the client 406, a semiconductor-based microprocessor (in the form of a microchip or chip set), or generally any device for executing software instructions. When the server 402 or the client 406 is in operation, the processor 408 may be configured to execute software stored within the memory system 410, to communicate data to and from the memory system 410, and to generally control operations of the server 402 and the client 406 pursuant to the software.

The I/O interfaces 412 may be used to receive user input from and/or for providing system output to one or more devices or components. User input may be provided via, for example, a keyboard and/or a mouse. System output may be provided via a display device and a printer (not shown). I/O interfaces 412 may include, for example, a serial port, a parallel port, a Small Computer System Interface (SCSI), an IR interface, an RF interface, and/or a universal serial bus (USB) interface.

The network interface 414 may be used to transmit and receive from an external server 402 or a client 406 on a network 404. The network interface 414 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 414 may include address, control, and/or data connections to enable appropriate communications on the network 404.

The memory system 410 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 410 may incorporate electronic, magnetic, optical, and/or other types of storage media. Note that the memory system 410 may have a distributed architecture, where various components are situated remote from one another, but may be accessed by the processor 408.

The software in memory system 410 may include one or more software programs, each of which comprises an ordered listing of executable instructions for implementing logical functions. In the example of FIG. 4, the software in the memory 410 of the server 402 may comprise a data mining engine 440 (e.g., data mining engine 202) and a suitable operating system (O/S) 418. In the example of FIG. 4, the software in the memory 410 of the client 406 may comprise a user interface 430 and a suitable operating system (O/S) 418. The operating system 418 essentially controls the execution of other computer programs, such as the operating system 418, the user interface 400, and provides scheduling, input-output control, file and data management, memory management, and communication control and related services.

The data mining engine 440 may be used for providing search results responsive to a query type selected by a user. In an aspect, the query type may be one or more of the query types listed above, keywords, a phrase, a question, a natural language query, a concept, combinations thereof, and the like. A search result may comprise a web site or any other electronic file. The present description will refer to web sites for simplicity. A web site may reside on a network 404 (e.g., Internet) and may be a collection of one or more web pages, which are electronic documents that may be coded, for example, in HTML that are linked to each other and very often to pages on other web sites. A web site may be hosted on a website owner's server or on an ISP's (Internet Service Providers) server. A web site may share space on a server with other web sites, reside on the server 402 dedicated to that web site only, or be on multiple dedicated servers 402. A web page may contain a variety of information. Additionally, a web page may provide commercial transactions to users.

The data mining engine 440 may be configured to search for relevant data to be used to generate graphical representations (e.g., text, charts, graphs, etc.). The data mining engine 202 may comprise one or databases. The data mining engine 440 may use one or more algorithms to store and retrieve relevant search results in the database(s) responsive to the query type. The data mining engine 440 may comprise an updating algorithm to regularly search for new or updated SCM records. The data mining engine 440 may be configured to operate on one or multiple server(s) 402.

The data mining engine 440 may be configured to determine one or more of a domain-level link feature, a page-level link feature, a page-level keyword feature, a page-level content-based feature, a page-level keyword-agnostic feature, engagement data, traffic/query data, domain-level brand metrics, domain-level keyword usage, domain-level keyword-agnostic feature, page-level social metrics, and combinations thereof. The data mining engine 440 may utilize such features to determine a relevance of a potential search result. The data mining engine 440 may be configured to determine a similarity between data profiles.

The data mining engine 440 may be a source program, an executable program (object code), a script, or any other entity comprising a set of instructions to be performed. When the data mining engine 440 is a source program, then the data mining engine 440 may be translated via a compiler, assembler, interpreter, or the like, which may or may not be included within the memory system 410, so as to operate properly in connection with the O/S 418. Furthermore, the data mining engine 440 may be written as (a) an object oriented programming language, which has classes of data and methods, or (b) a procedure programming language, which has routines, subroutines, and/or functions, such as, for example, but not limited to, C, C++, Pascal, Basic, Fortran, Cobol, Perl, and Java.

When the data mining engine 440 is implemented in software, it should be noted that the data mining engine 440 may be stored on any computer readable medium for use by or in connection with any computer related system or method. In the context of this document, a computer readable medium is an electronic, magnetic, optical, or other physical device or means that may contain or store a computer program for use by or in connection with a computer related system or method. The data mining engine 440 may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any non-transitory means that may store, communicate, propagate, or transport the program for use by or in connection with the instruction execution system, apparatus, or device. The computer readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 5:
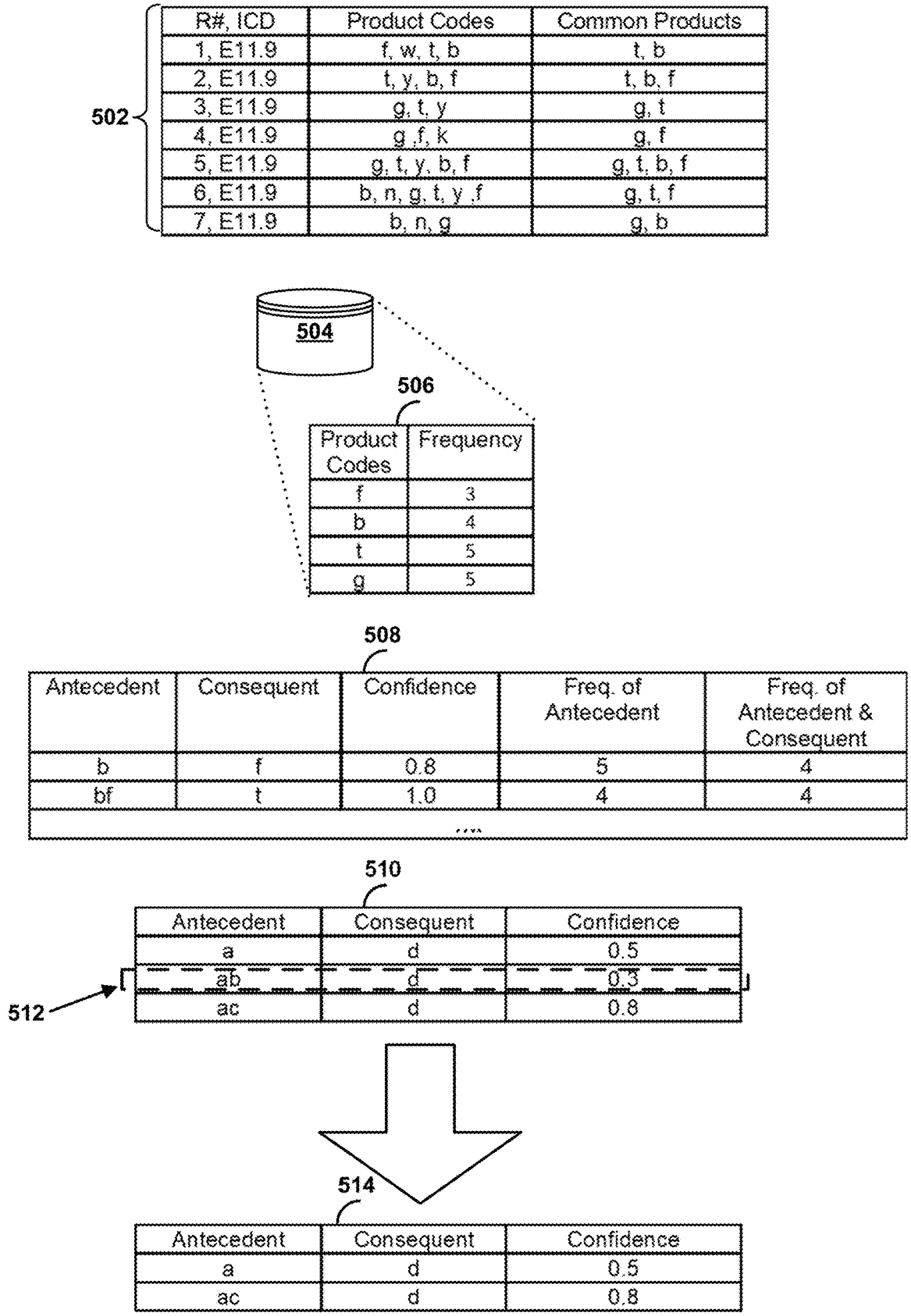
FIG. 5 shows a plurality of tables for association rule mining.

FIG. 5 shows a plurality of tables to illustrate how a data mining engine (e.g., data mining engine 202; data mining engine 440; etc.) may generate one or more association rules based on one or more sets of electronic records 502 stored in a database 504 (e.g., SCM data and/or purchase history data for an organization). Each of the electronic records 502 may have a record identifier column identifying a record number and a use attribute (e.g., an International Classification of Diseases (ICD) code, such as E11.9, a diagnostic code/identifier, etc.); a product code column identifying a product identifier (e.g., 'f,' 'w,' 't,' 'b,' etc.); and a common product column identifying one or more product identifiers that a given record has in common with all other records 502.

One or more association rule mining algorithms, such as an apriori algorithm or an FP-growth algorithm, may be used when mining frequent item sets in the records 502. For all records 502 in the database 504 with a frequency meeting or exceeding a minimum support count (e.g., min_sup=3), a frequency table 506 may be constructed that identifies a product code (e.g., 'f') and its corresponding frequency count (e.g., 3). As shown in FIG. 5, the entries in the frequency table 506 may be sorted in increasing frequency order.

Using the records 502, the data mining engine may generate a FP-tree identifying frequent patterns of product code identifiers. Records having common product identifiers may be merged in the FP-tree by incrementing counter values for a merged set of product identifiers. The FP-tree may be constructed so that records with a common use attribute share a same path in the FP-tree. The data mining engine may build the FP-tree by generating a data structure that may be stored in memory and identifies a root of the FP-tree as well as various nodes and branches that connect to the root the FP-tree. The data mining engine may access the data structure stored in memory to identify the root node and generate a link from the root node to a first node having a product identifier attribute (e.g., 'f') and a counter attribute (e.g., 4). The generated link may be based on the information stored in the records 502. As one skilled in the art can appreciate, when the first node is generated the counter attribute initially has a value set to 1 and a link field (not shown) may be generated and added to the records 502 for storing a pointer that points to another node(s) having a same product identifier attribute as the first node. This process may iterate until the FP-tree is fully constructed (e.g., each product identifier has an associated node).

The FP-tree may be used to determine frequent patterns by following the generated node links associated with each product identifier in the records 502. Frequent patterns may be mined to generate a frequency table 506 by using an FP-growth algorithm, which may determine all paths within the FP-tree associated with a given product identifier. A conditional FP-tree may be generated by the data mining engine by recursively invoking the FP-growth algorithm to mine the frequent patterns. For example, with reference to the frequency table 506, product code 'b' has a frequency of 4. Conditional pattern bases may be generated for product code 'b' with respect to all other product codes in the frequency table 506. Each conditional pattern base for product code 'b' may indicate a number of sets containing product code 'b' and another product code (e.g., product code 'b' and product code 't' are both present in 3 of the records in the records 502). The conditional FP-tree may be mined (e.g., once fully completed) for all sets that include product code 'b'.

The FP-tree may be mined for specific patterns with respect to the product codes within the identified sets. The FP-tree may be mined using various data mining algorithms. For example, conditional-based mining operations may be performed by the data mining engine using the FP-tree. For each frequent product code, the data mining engine may construct a conditional pattern base identifying a set of paths in the FP-tree associated with the use attribute shown in the records 502. The conditional FP-tree may be recursively mined according to the identified product codes. For example, processing frequent product code 'f' (e.g., in a manner similar to product code 'b') may result in the data mining engine determining a frequent pattern f:3 (e.g., the number of sets containing product code 'f') and a conditional pattern base b:2 (e.g., the number of sets containing product code 'f' as well as product code 'b').

The data mining engine may determine, for each of the frequent product codes in the FP-tree, a corresponding frequent product code count. As an example, as shown in FIG. 5 frequent product code 'f' has a frequent product code count of 2 with respect to product code 'b' (e.g., product code 'f' is in 2 sets that also contain product code 'b'). Based on the frequent product code counts for each of the frequent product codes in the FP-tree, the data mining engine may generate one or more association rules, such as those shown in association rule table 508. As shown in the association rule table 508, association rules may include one or more of the following attributes: an antecedent, a consequent, a confidence, a frequency of the antecedent, and a frequency of the antecedent and the consequent. For example, the first row of the association rules table 508 includes an antecedent of 'b', a consequent of T, a confidence of 0.8, a frequency of antecedent 5, and a frequency of antecedent and consequent of 4.

The data mining engine may remove and/or modify one or more of the association rules in the association rules table 508 when generating a final association rule set 514. A child association rule may be a rule in the association rules table 508 that contains a same consequent as a parent association rule but has an antecedent that contains the antecedent of the parent association rule as a subset. The data mining engine may remove a child association rule when it has a lower or same confidence (e.g., lift) as compared to its corresponding parent association rule (e.g., the child association rule is a redundant rule and therefore removed). For example, as shown in preliminary association rule set 510, a parent association rule may indicate that frequent pattern sets containing product code 'a' also contain product code 'd.' A child association rule 512 may indicate that frequent pattern sets containing product codes 'a' and 'b' also contain product code 'd.' The parent association rule may have a confidence level of 0.5, while the child association rule 512 may have a confidence level of 0.3. Accordingly, the data mining engine may determine that the child association rule 512 is a redundant association rule and therefore remove it. Once all redundant association rules are removed, the preliminary association rule set 510 may be updated/modified to generate the final association rule set 514.

Figure 6:
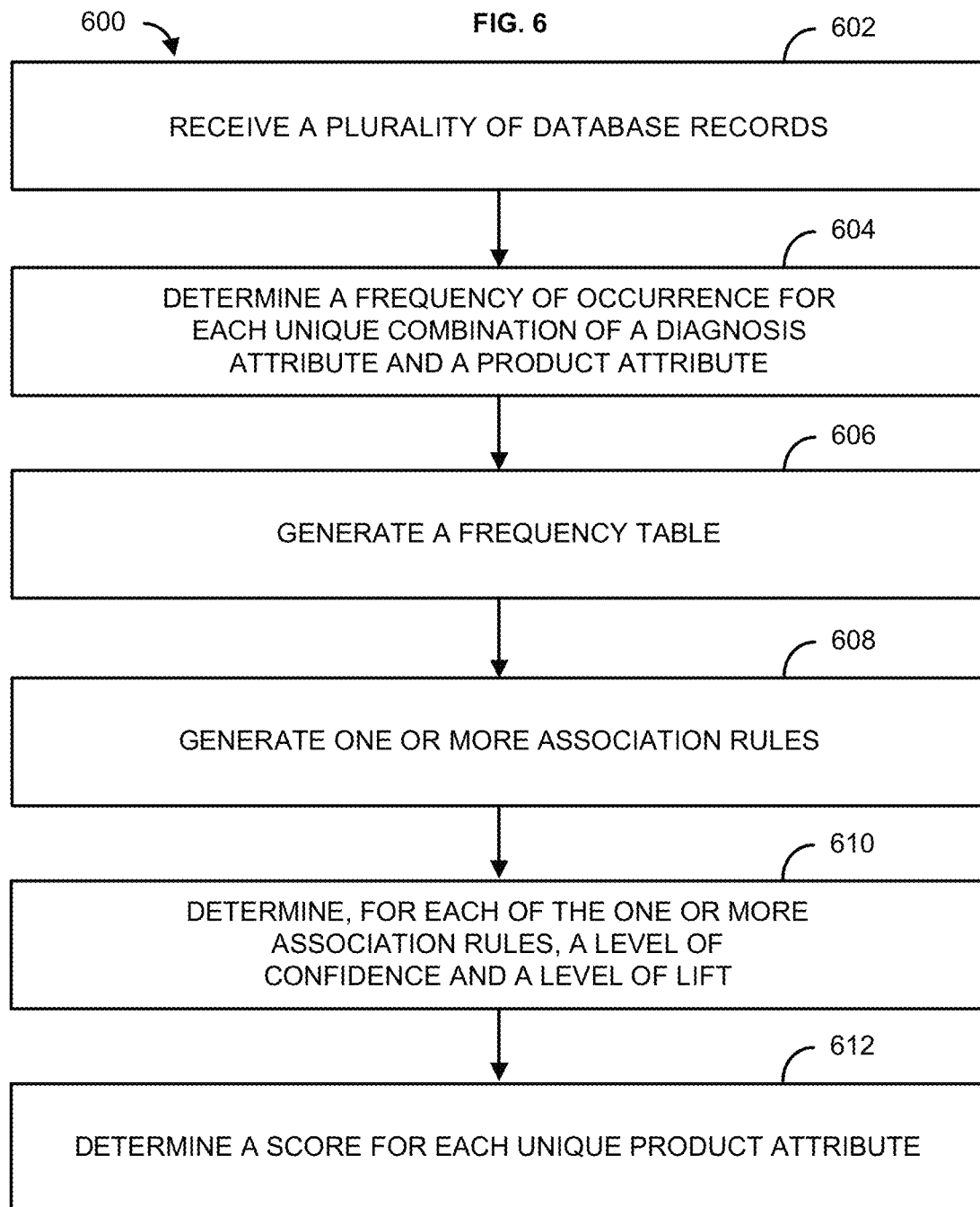
FIG. 6 shows a flowchart of an example method.

FIG. 6 is a flowchart depicting an example method 600 for improving SCM systems and functionality. At step 602, a plurality of database records may be received (e.g., by a data mining engine). The plurality of database records may be associated with supply chain information for a medical services provider. Each database record of the plurality of database records may indicate a diagnosis attribute (e.g., a medical condition) and at least one product attribute (e.g., a product code and/or product identifier). At step 604, a frequency of occurrence for each unique combination of diagnosis attribute and product attribute may be determined. The frequency of occurrence for each unique combination may be based on an association rule mining algorithm, such as an apriori algorithm, an FP-growth algorithm, or the like. At step 606, a frequency table listing each unique combination of diagnosis attribute and product attribute may be generated. The frequency table may be based on the frequency of occurrence for each unique combination of diagnosis attribute and product attribute.

At step 608, one or more association rules may be generated. Each of the one or more association rules may have an antecedent, a consequent, a frequency of the antecedent, a frequency of the consequent, and/or a frequency of the antecedent and the consequent. The one or more association rules may be generated based on the frequency table. The one or more association rules may be generated based on an FP-tree and/or conditional FP-tree constructed in accordance with the present description. At step 610, a level of confidence and a level of lift may be determined for each of the one or more association rules. A level of confidence for an association rule may be based on a level of support associated with a union of an antecedent and a consequent (e.g., based on a frequency of the antecedent and consequent co-occurring) divided by a level of support for the antecedent (e.g., based on a frequency of occurrence of the antecedent). A level of lift for an association rule may be based on the level of support associated with the union of the antecedent and the consequent divided by the level of support for the antecedent times a level of support of the consequent (e.g., based on a frequency of occurrence of the consequent). At step 612, a score for each unique product attribute may be determined. The score may be based on the level of confidence and the level of lift for each of the one or more association rules. For example, the score (e.g., 0.6) may be equal to a weight associated with the level of confidence (e.g., a pre-determined weight set by the medical services provider) times the level of confidence (e.g., 0.8× 0.5) plus a weight associated with the level of lift (e.g., a pre-determined weight set by the medical services provider) times the level of lift (e.g., 0.4×0.5).

Figure 7:
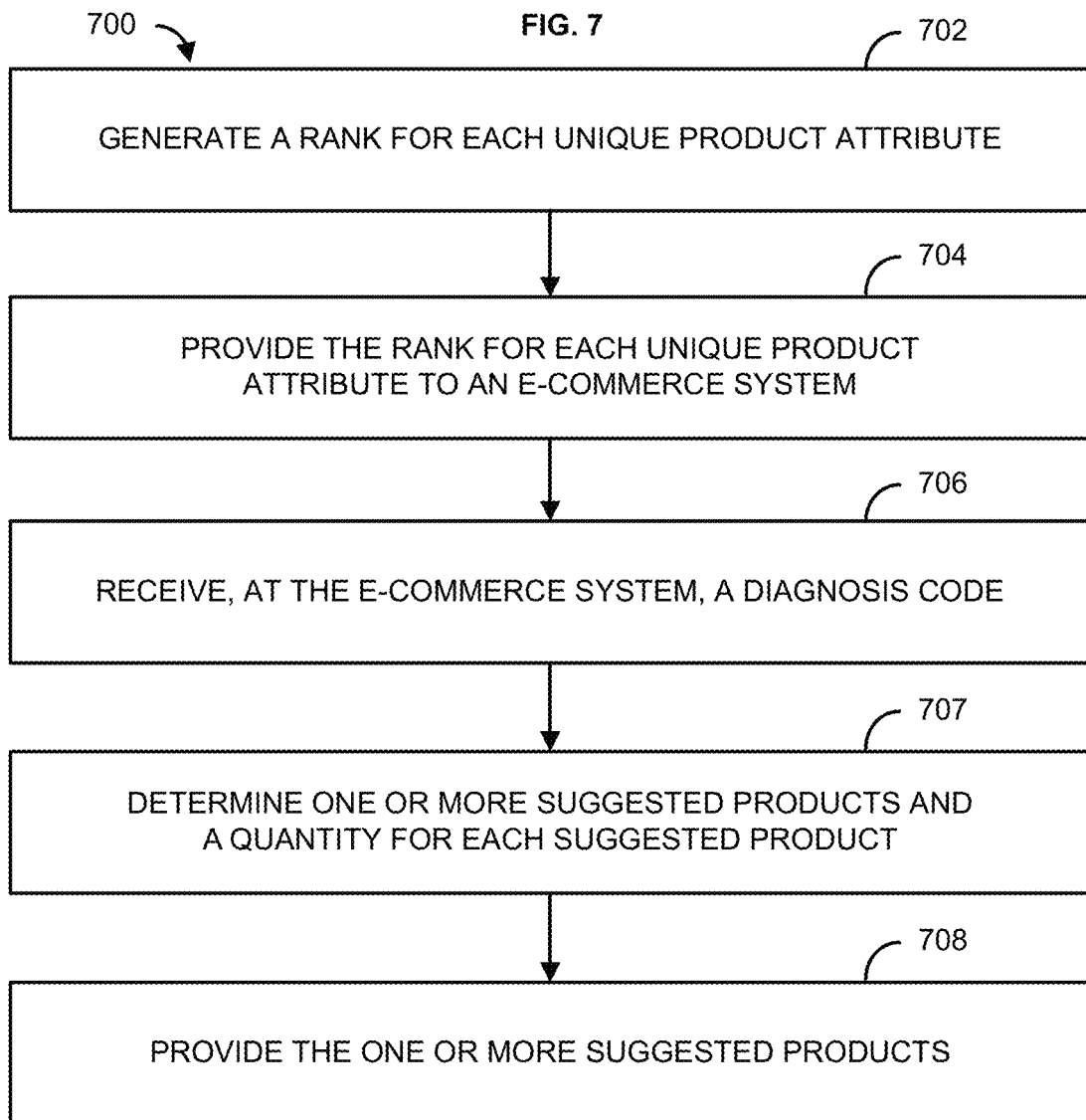
FIG. 7 shows a flowchart of an example method.

FIG. 7 is a flowchart depicting an example method 700 for improving SCM systems and functionality. Method 700 may be implemented in tandem with, or separately from, method 600. At step 702, a rank for each unique product attribute within a plurality of database records may be generated (e.g., by a data mining engine). The plurality of database records may be associated with supply chain information for a medical services provider. Each database record of the plurality of database records may indicate a diagnosis attribute (e.g., a medical condition) and at least one product attribute (e.g., a product code and/or product identifier). Each unique product attribute may be associated with a score (e.g., based on a level of confidence and a level of lift for each of one or more association rules). The rank for each unique product attribute may be based on its respective score. At step 704, the rank for each unique product attribute may be provided to a database associated with an e-commerce system. The rank for each unique product attribute may be based on a preference provided by a third party payor (e.g., an insurance company) such that a list of the unique product attributes, as discussed below, may be provided in a sorted order of highest-to-lowest rank based on the preference. At step 706, a diagnosis code may be received by the e-commerce system (e.g., entered in an SCM interface by a user). At step 707, the e-commerce system may determine one or more suggested products and a suggested quantity for each of the one or more suggested products. The suggested quantity for each of the one or more suggested products may be based on symptom attributes associated with the diagnosis code (e.g., cough, fever, pain, etc.); historical purchasing behavior associated with the user; an amount of an allowance provided by associated claims payors, a combination thereof, and/or the like. In addition to the suggested quantity for each of the one or more suggested products, an ordering schedule may also be suggested. The ordering schedule may be based on existing purchasing cadence associated with the user. At step 708, the e-commerce system may provide the one or more suggested products (e.g., one or more product names each associated with a product code/identifier) based on the diagnosis code received by the e-commerce system. The one or more suggested products may be indicative of one or more product codes/identifiers associated with the diagnosis code (e.g., as indicated by the plurality of database records).

Figure 8:
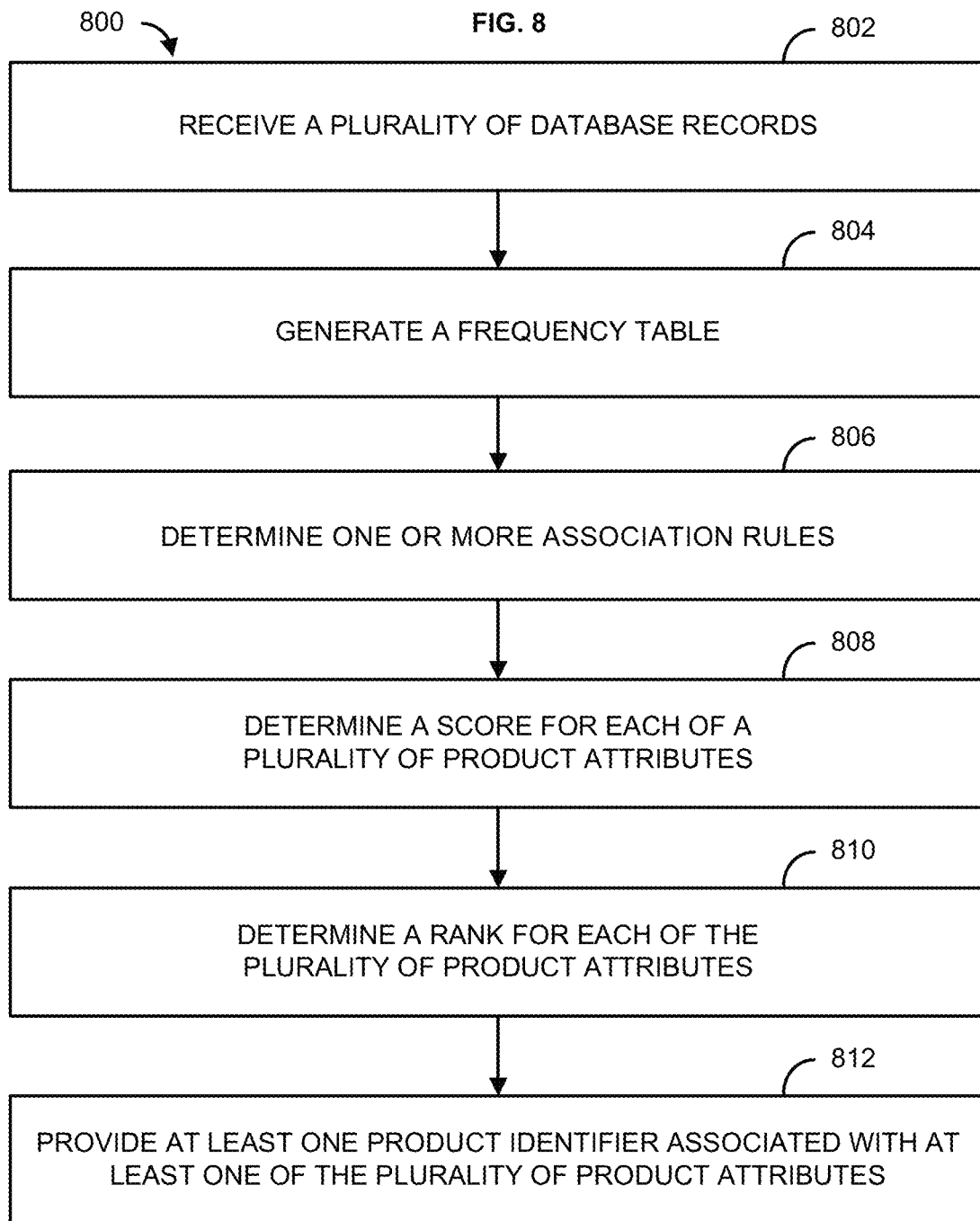
FIG. 8 shows a flowchart of an example method.

FIG. 8 is a flowchart depicting an example method 800 for improving SCM systems and functionality. Method 800 may be implemented in tandem with, or separately from, method 600 and/or method 700. At step 802, a plurality of database records may be received (e.g., by a data mining engine). The plurality of database records may be associated with supply chain information for a medical services provider. Each database record of the plurality of database records may indicate a diagnosis attribute (e.g., a medical condition) and a plurality of product attributes (e.g., a product code and/or product identifier). A frequency of occurrence of the diagnosis attribute and each of the plurality of product attributes may be determined. The frequency of occurrence of the diagnosis attribute and each of the plurality of product attributes may be based on an association rule mining algorithm, such as an apriori algorithm, an FP-growth algorithm, or the like. At step 804, a frequency table listing each combination of the diagnosis attribute and each of the plurality of product attributes may be generated. The frequency table may be based on the frequency of occurrence of the diagnosis attribute and each of the plurality of product attributes.

At step 806, one or more association rules may be generated. Each of the one or more association rules may have an antecedent, a consequent, a frequency of the antecedent, a frequency of the consequent, and/or a frequency of the antecedent and the consequent. The one or more association rules may be generated based on the frequency table. The one or more association rules may be generated based on an FP-tree and/or conditional FP-tree constructed in accordance with the present description. A level of confidence and a level of lift may be determined for each of the one or more association rules. A level of confidence for an association rule may be based on a level of support associated with a union of an antecedent and a consequent (e.g., based on a frequency of the antecedent and consequent co-occurring) divided by a level of support for the antecedent (e.g., based on a frequency of occurrence of the antecedent). A level of lift for an association rule may be based on the level of support associated with the union of the antecedent and the consequent divided by the level of support for the antecedent times a level of support of the consequent (e.g., based on a frequency of occurrence of the consequent). At step 808, a score for each of the plurality of product attributes may be determined. The score may be based on the level of confidence and the level of lift for each of the one or more association rules. For example, the score (e.g., 0.6) may be equal to a weight associated with the level of confidence (e.g., a pre-determined weight set by the medical services provider) times the level of confidence (e.g., 0.8×0.5) plus a weight associated with the level of lift (e.g., a pre-determined weight set by the medical services provider) times the level of lift (e.g., 0.4×0.5).

At step 810, a rank for each of the plurality of product attributes may be determined (e.g., by a data mining engine). The rank for each of the plurality of product attributes may be based on its respective score. The rank for each of the plurality of product attributes may be provided to a database associated with an e-commerce system. The rank for each of the plurality of product attributes may be based on a preference provided by a third party payor (e.g., an insurance company) such that a list of the each of the plurality of product attributes, as discussed below, may be provided in a sorted order of highest-to-lowest rank based on the preference.

A diagnosis code may be received by the e-commerce system (e.g., as part of a search query entered in an SCM interface by a user). In response to receiving the diagnosis code, the e-commerce system may determine one or more suggested products (e.g., product identifiers) and a suggested quantity for each of the one or more suggested products. The suggested quantity for each of the one or more suggested products may be based on symptom attributes associated with the diagnosis code (e.g., cough, fever, pain, etc.); historical purchasing behavior associated with the user; an amount of an allowance provided by associated claims payors, a combination thereof, and/or the like. In addition to the suggested quantity for each of the one or more suggested products, an ordering schedule may also be suggested. The ordering schedule may be based on existing purchasing cadence associated with the user. At step 812, at least one product identifier (e.g., one or more product names each associated with a product code/attribute) may be provided (e.g., by the e-commerce system) based on the diagnosis code received (e.g., by the e-commerce system) and the rank for each of the plurality of product attributes. The at least one product identifier may be indicative of one or more product codes/identifiers associated with the diagnosis code (e.g., as indicated by the plurality of database records).

Figure 9:
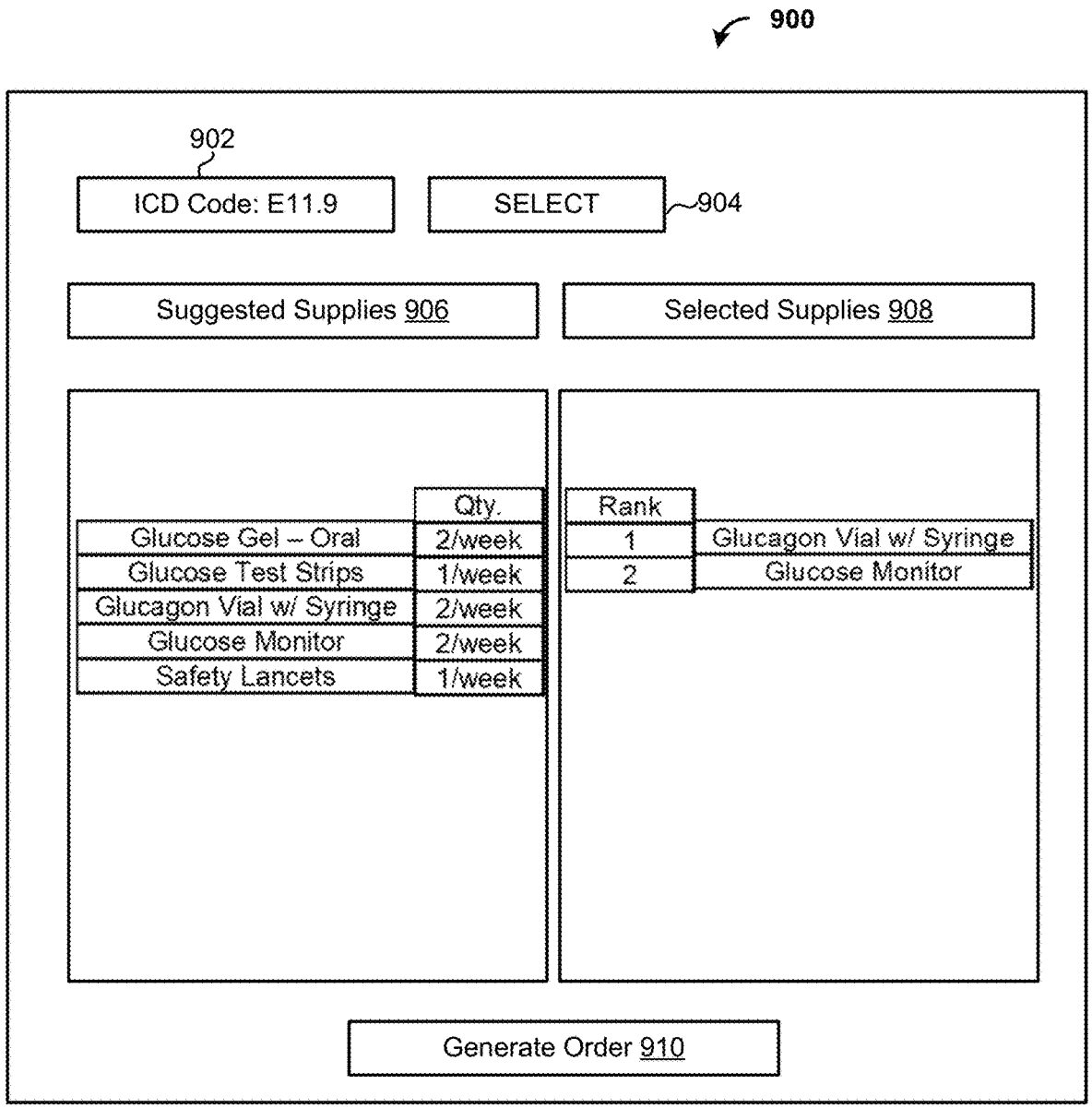
FIG. 9 shows an example user interface.

FIG. 9 is a schematic diagram depicting an example of a user interface 900. The user interface 900 may be associated with an e-commerce system, such as an SCM system. The user interface 900 may comprise a diagnosis box 902 (e.g., for entering a diagnosed medical condition), a select button 904, a suggested supplies section 906, a selected supplies section 908, and a generate order button 910. A user of the user interface 900 may enter diagnosis code E11.9, which may correspond to a diagnosis of Type II Diabetes. A data mining engine may receive the entered diagnosis code and then determine (e.g., using the systems and methods described above) one or more supplies (e.g., product identifiers/codes) associated with the entered diagnosis code. The one or more supplies may be displayed at the user interface 900 in the suggested supplies section 906. As shown in FIG. 9, the data mining engine may determine that products "Glucose Gel—Oral;" "Glucose Test Strips;" Glucagon Vial w/Syringe;" "Glucose Monitor;" and "Safety Lancets" are associated with the diagnosis code E11.9. The user may select one or more of the products listed in the suggested supplies section 906 (e.g., by clicking on each; sliding each, etc.). The one or more selected products may be shown in the selected supplies section 908. The user interface 900 may be configured to cause the associated e-commerce system to order (e.g., purchase) the one or more selected products shown in the selected supplies section 908 based on the user clicking the generate order button 910. While the user interface 900 is shown as being a single screen, it is to be understood that FIG. 9 is only intended to be exemplary and not meant to be limiting.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:

generating, by a computing device, a frequent pattern tree (FP-tree) comprising a plurality of nodes that are each associated with one of a plurality of database records, wherein each of the plurality of database records comprises a medical diagnosis attribute and a product attribute;

determining a first plurality of links in the FP-tree between nodes of the plurality of nodes sharing a common medical diagnosis attribute and a common product attribute, wherein the first plurality of links are each indicative of a path to a root node of the FP-tree;

determining, for each product attribute within the plurality of database records, a second plurality of links in the FP-tree between nodes of the plurality of nodes that are associated with database records, of the plurality of database records, comprising the corresponding product attribute, wherein the second plurality of links are each indicative of a path to the root node of the FP-tree;

recursively invoking an FP-growth algorithm to determine, based on the first plurality of links and the second plurality of links in the FP-tree and the corresponding paths to the root node of the FP-tree, a frequency of occurrence for each unique combination of medical diagnosis attribute and product attribute;

determining, based on the frequency of occurrence for each unique combination of medical diagnosis attribute and product attribute, a preliminary association rule set, wherein each association rule in the preliminary association rule set comprises a level of confidence and one or more of the product attributes within the plurality of database records;

removing, based on the level of confidence for a first association rule of the preliminary association rule set being less than or equal to the level of confidence for a second association rule of the preliminary association rule set, the first association rule from the preliminary association rule set to generate a final association rule set; and providing, based on the final association rule set, and based on a query comprising a first medical diagnosis attribute, at least one product identifier and a suggested quantity, wherein the at least one product identifier and the suggested quantity are associated with the first medical diagnosis attribute.

2. The method of claim 1, wherein the at least one product identifier comprises at least one product attribute.

3. The method of claim 2, wherein the at least one product attribute is within the plurality of database records and is associated with at least one unique combination of the first medical diagnosis attribute and the at least one product attribute.

4. The method of claim 1, wherein the first medical diagnosis attribute is associated with at least one symptom attribute.

5. The method of claim 4, wherein the first medical diagnosis attribute comprises a diagnosis code, wherein the at least one symptom attribute is based on the diagnosis code.

6. The method of claim 4, wherein the at least one product attribute corresponds to the at least one symptom attribute.

7. The method of claim 4, wherein the suggested quantity is based on the at least one symptom attribute.

8. A non-transitory computer-readable storage medium comprising computer-executable instructions that, when executed by a computing device, cause the computing device to:
generate a frequent pattern tree (FP-tree) comprising a plurality of nodes that are each associated with one of a plurality of database records, wherein each of the plurality of database records comprises a medical diagnosis attribute and a product attribute;
determine a first plurality of links in the FP-tree between nodes of the plurality of nodes sharing a common medical diagnosis attribute and a common product attribute, wherein the first plurality of links are each indicative of a path to a root node of the FP-tree;
determine, for each product attribute within the plurality of database records, a second plurality of links in the FP-tree between nodes of the plurality of nodes that are associated with database records, of the plurality of database records, comprising the corresponding product attribute, wherein the second plurality of links are each indicative of a path to the root node of the FP-tree;
recursively invoke an FP-growth algorithm to determine, based on the first plurality of links and the second plurality of links in the FP-tree and the corresponding paths to the root node of the FP-tree, a frequency of occurrence for each unique combination of medical diagnosis attribute and product attribute;
determine, based on the frequency of occurrence for each unique combination of medical diagnosis attribute and product attribute, a preliminary association rule set, wherein each association rule in the preliminary association rule set comprises a level of confidence and one or more of the product attributes within the plurality of database records;
remove, based on the level of confidence for a first association rule of the preliminary association rule set being less than or equal to the level of confidence for a second association rule of the preliminary association rule set, the first association rule from the preliminary association rule set to generate a final association rule set; and
provide, based on the final association rule set, and based on a query comprising a first medical diagnosis attribute, at least one product identifier and a suggested quantity, wherein the at least one product identifier and the suggested quantity are associated with the first medical diagnosis attribute.

9. The non-transitory computer-readable storage medium of claim 8, wherein the at least one product identifier comprises at least one product attribute.

10. The non-transitory computer-readable storage medium of claim 9, wherein the at least one product attribute is within the plurality of database records and is associated with at least one unique combination of the first medical diagnosis attribute and the at least one product attribute.

11. The non-transitory computer-readable storage medium of claim 8, wherein the first medical diagnosis attribute is associated with at least one symptom attribute.

12. The method of claim non-transitory computer-readable storage medium of claim 11, wherein the first medical diagnosis attribute comprises a diagnosis code, wherein the at least one symptom attribute is based on the diagnosis code.

13. The non-transitory computer-readable storage medium of claim 11, wherein the at least one product attribute corresponds to the at least one symptom attribute.

14. The non-transitory computer-readable storage medium of claim 11, wherein the suggested quantity is based on the at least one symptom attribute.

15. An apparatus comprising:
at least one processor; and
memory storing processor-executable instructions that, when executed by the at least one processor, cause the apparatus to:
generate a frequent pattern tree (FP-tree) comprising a plurality of nodes that are each associated with one of a plurality of database records, wherein each of the plurality of database records comprises a medical diagnosis attribute and a product attribute;
determine a first plurality of links in the FP-tree between nodes of the plurality of nodes sharing a common medical diagnosis attribute and a common product attribute, wherein the first plurality of links are each indicative of a path to a root node of the FP-tree;
determine, for each product attribute within the plurality of database records, a second plurality of links in the FP-tree between nodes of the plurality of nodes that are associated with database records, of the plurality of database records, comprising the corresponding product attribute, wherein the second plurality of links are each indicative of a path to the root node of the FP-tree;
recursively invoke an FP-growth algorithm to determine, based on the first plurality of links and the second plurality of links in the FP-tree and the corresponding paths to the root node of the FP-tree, a frequency of occurrence for each unique combination of medical diagnosis attribute and product attribute;
determine, based on the frequency of occurrence for each unique combination of medical diagnosis attribute and product attribute, a preliminary association rule set, wherein each association rule in the preliminary association rule set comprises a level of confidence and one or more of the product attributes within the plurality of database records;
remove, based on the level of confidence for a first association rule of the preliminary association rule set being less than or equal to the level of confidence for a second association rule of the preliminary association rule set, the first association rule from the preliminary association rule set to generate a final association rule set; and
provide, based on the final association rule set, and based on a query comprising a first medical diagnosis attribute, at least one product identifier and a suggested quantity, wherein the at least one product identifier and the suggested quantity are associated with the first medical diagnosis attribute.

16. The apparatus of claim 15, wherein the at least one product identifier comprises at least one product attribute.

17. The apparatus of claim 16, wherein the at least one product attribute is within the plurality of database records and is associated with at least one unique combination of the first medical diagnosis attribute and the at least one product attribute.

18. The apparatus of claim 15, wherein the first medical diagnosis attribute is associated with at least one symptom attribute.

19. The apparatus of claim 18, wherein the first medical diagnosis attribute comprises a diagnosis code, wherein the at least one symptom attribute is based on the diagnosis code.

20. The apparatus of claim 18, wherein the at least one product attribute corresponds to the at least one symptom attribute, and wherein the suggested quantity is based on the at least one symptom attribute.

\* \* \* \* \*